United States Patent
Saito et al.

(10) Patent No.: US 7,345,132 B2
(45) Date of Patent: Mar. 18, 2008

(54) METHOD OF PRODUCING NOVOLAK RESIN

(75) Inventors: Noriaki Saito, Toyonaka (JP); Ichishi Aizu, Niihama (JP); Nobuyuki Nakajima, Niihama (JP); Masahiro Fujiwara, Niihama (JP); Koji Yano, Niihama (JP)

(73) Assignee: Chang Chun Plastics Co. Ltd, Hsinchu Industrial District (TW)

( * ) Notice: Subject to any disclaimer, the term of this patent is extended or adjusted under 35 U.S.C. 154(b) by 0 days.

(21) Appl. No.: 11/037,058

(22) Filed: Jan. 19, 2005

(65) Prior Publication Data

US 2005/0124778 A1 Jun. 9, 2005

Related U.S. Application Data

(62) Division of application No. 10/000,364, filed on Dec. 4, 2001, now Pat. No. 6,936,680.

(30) Foreign Application Priority Data

Dec. 12, 2000 (JP) .............................. 2000-377258
Dec. 12, 2000 (JP) .............................. 2000-377259
May 23, 2001 (JP) .............................. 2001-153632

(51) Int. Cl.
*C08G 14/04* (2006.01)
(52) U.S. Cl. ...................... 528/129; 528/144; 528/486; 528/500; 528/501; 528/502 C; 528/503

(58) Field of Classification Search ................ 528/129, 528/486, 144, 500, 501, 502 C, 503
See application file for complete search history.

(56) References Cited

U.S. PATENT DOCUMENTS 4,876,324 A * 10/1989 Nakano et al. ............. 528/142
6,045,966 A    4/2000 Rahman et al.
6,121,412 A    9/2000 Wanat et al.

FOREIGN PATENT DOCUMENTS

JP    2000-264941 A    9/2000

OTHER PUBLICATIONS

Casiraghi, Giovanni, et al., Uncatalysed Phenol-Formaldehyde Reactions—A Convenient Synthesis of All-*ortho* Novolac Resins, Makromol. Chem., 1981, 2973-2979, 182.

* cited by examiner

*Primary Examiner*—Duc Truong
(74) *Attorney, Agent, or Firm*—Sughrue Mion, PLLC

(57) ABSTRACT

Provided an industrially excellent method of producing a phenol novolak resin having an ortho ratio of 30% or more by: (1) a method of reacting a phenol and an aldehyde using an oxalic acid catalyst at 110 to 160° C. under pressure; or (2) a method of reacting a phenol and an aldehyde under pressure while removing the heat of reaction by a condenser with controlling a pressure so that water or an organic solvent present in the reaction system is refluxed.

5 Claims, No Drawings

METHOD OF PRODUCING NOVOLAK RESIN

This application is a DIV of 10/000,364, filed Dec. 04, 2001; now U.S. Pat. 6,936,680.

BACKGROUND OF THE INVENTION

1. Field of the Invention

The present invention relates to a method of producing a phenol novolak resin having an ortho ratio of 30% or more.

2. Description of the Related Art

Phenol novolak resins are used in various fields such as molding materials, epoxy resin curing agents, photoresist resins, epoxy resin raw materials and the like. It is well known that the properties thereof, particularly the reactivity changes depending on the ratio of the ortho position of methylene bonds derived from raw material aldehyde, namely, the ortho ratio ("Phenol Resin": pp. 48 to 52, 1987, published from Plastics Age). For example, it is known that when the ortho ratio increases, curing speed by an amine compound increases. In the case of a novolak epoxy resin obtained by epoxidizing a phenol novolak resin, it is also known that curing speed increases likewise. Thus, novolak resins having various ortho ratios are produced according to their use.

For example, it is known that, in a reaction of a phenol with formalin, those having an ortho ratio of around 20% can be produced by using p-toluenesulfonic acid as a catalyst, and those having an ortho ratio of around 40% can be produced by using oxalic acid as a catalyst. It is also known that those having an ortho ratio of over 60%, called high-ortho novolak, can be produced by using zinc acetate. Further, in the case of production of a phenol novolak resin having an ortho ratio of around 40%, a catalyst used is weaker acidic as compared with that used in producing a phenol novolak resin having an ortho ratio of around 20%, therefore, for improving reactivity, there are also tried methods of reacting longer time, conducting dehydration with increasing the temperature, and the like (JP-A No. 62-275121).

However, these methods of improving reactivity have a problem of low yield, and further, have an industrial problem that a drain such as distilled water, separated water and the like contains a large amount of raw material phenols. Such a phenol novolak resin is usually produced by reacting a phenol and formalin under a normal pressure (Phenol Resin: pp. 83 to 85, 1987, published by Plastic Age K.K.).

On the other hand, methods of reaction under pressure are also known. For example, proposed are methods of producing a high-ortho novolak resin by reaction under pressure using an organic solvent (Makromol. Chem. 182. 2973 (1981), JP-A No. 2000-264941, and the like).

When a phenol novolak resin is produced in industrial scale, a method of removing the heat of reaction becomes a problem. In the case of a reaction under normal pressure, cooling efficiency is poor and heat removal is difficult by cooling only with a jacket because of high viscosity of the reaction system and a glass lining vessel used for reaction under an acidic condition, therefore, the reaction is generally conducted with removing the heat by refluxing water or an organic solvent present in the system with using a condenser.

On the other hand, in case of a reaction under pressure, even if a condenser is equipped, reflux is hard to occur and removal of the heat of reaction is difficult probably due to the presence of an inert gas used at the time of charging raw materials. Therefore, there are conventionally adopted a method of reducing the charging amount of a raw materials, a method of conducting reaction for a long period of time with dropping aldehyde in portion wise, and the like, according to the cooling ability of a reaction vessel jacket. However, in the former method, the production amount per reaction vessel decreases, and in the latter method, the reaction time elongates, accordingly, both methods have a problem of poor productivity.

SUMMARY OF THE INVENTION

The present inventors have intensively studied for solving the above problems, and resultantly found that the desired phenol novolak resin can be obtained with high yield by conducting a reaction of a phenol and an aldehyde under specific conditions, leading to completion of the invention.

Namely, the present invention provides a method of producing a phenol novolak resin having an ortho ratio of 30% or more wherein a phenol and an aldehyde are reacted using an oxalic acid catalyst at 110 to 160° C. under pressure.

Further, the present invention provides a method of producing a phenol novolak resin having an ortho ratio of 30% or more wherein a phenol and an aldehyde are reacted under pressure while removing the heat of reaction by a condenser with controlling a pressure so that water or an organic solvent present in the reaction system is refluxed.

Furthermore, the present invention provides a method of producing a phenol novolak resin having an ortho ratio of 30% or more wherein a crude phenol novolak resin having an ortho ratio of less than 30% is heated at 110 to 180° C. in the presence of a strong acidic catalyst.

The present invention provides an industrially excellent method of producing a phenol novolak resin in improved productivity.

DETAILED DESCRIPTION OF THE INVENTION

The phenol used in the present invention are not particularly restricted, and examples thereof include: a phenol; substituted phenols having a substituent such as an alkyl group containing 1 to 9 carbon atoms, a halogen, an aromatic group and the like; and polyhydric phenols such as resorcin, hydroquinone, phloroglycine and the like. Here, in the case of phenol having a substituent, the number of substituents is usually from 1 to 3 and substituted phenol in which at least two of three reaction positions (one para position and two ortho positions to phenolic hydroxyl group) are unsubstituted are preferably used. In particular, bifunctional phenol such as ortho-cresol and the like are preferable from the standpoints of reactivity and the like.

Further, examples the aldehyde used in the present invention include formaldehyde, acetaldehyde, butylaldehyde, benzaldehyde, hydroxybenzaldehyde, acrolein, glyoxal and the like. Particularly, in the case of formaldehyde, formalin, paraform, trioxane and the like can also be used. Of them, formalin is preferable from the standpoints of handling property and the like. The using amount of aldehyde differs depending on the molecular weight of a desired phenol novolak resin, and it is usually from 0.5 to 0.99-fold mol based on the phenol.

In the method (1) of the present invention of producing a phenol novolak resin having an ortho ratio of 30% or more wherein a phenol and an aldehyde are reacted using an oxalic acid catalyst at 110 to 160° C. under pressure, oxalic acid used as a catalyst is usually a crystal of a dihydrate, and may be used in the form of an aqueous solution. The amount of oxalic acid is usually from 0.001 to 0.1-fold mol based on the phenol. If necessary, a strong acid such as sulfuric acid, hydrochloric acid, toluenesulfonic acid and the like may be used in small amount, as an additional catalyst added during the reaction. In this case, the amount is usually from 0.0001 to 0.01-fold mol based on the phenol.

Here, the reaction is conducted at a reaction temperature of from 110 to 160° C. under pressure using an oxalic acid catalyst. When the temperature is too low, the reaction speed decreases, and when too high, a side reaction such as decomposition of oxalic acid and the like occurs undesirably. The reaction temperature is preferably from 120 to 150° C. The ortho ratio can be controlled by changing the reaction temperature. Namely, the ortho ratio increases when the reaction is conducted at a high temperature while decreases when the reaction is conducted at a low temperature. In the present invention, a phenol novolak resin having an ortho ratio of 30 to 60%, suitably of 30 to 55% is produced. The pressure in the reaction is usually from about 0.01 to 0.15 Mpa, preferably from about 0.05 to 0.1 Mpa.

The present invention can be carried out, for example, as described below. A phenol and oxalic acid are charged into a corrosion-resistant autoclave equipped with a thermometer and a stirrer, the atmosphere is purged with nitrogen, then, the autoclave is sealed and heated. Next, an aldehyde is added continuously or discontinuously at a given temperature, and the mixture is kept at the same temperature to complete the reaction. Then, the solution is neutralized with an alkali if necessary, and washed with water, dehydrated under reduced pressure, and stripping is conducted, to obtain a phenol novolak resin.

According to the above method, a desired phenol novolak resin can be obtained efficiently. Further, an industrial merit that the amount of phenol in a drain (distilled water and/or separated water) can be reduced is also attained.

The present invention provides (2) a method of producing a phenol novolak resin having an ortho ratio of 30% or more wherein a phenol and an aldehyde are reacted under pressure while removing the heat of reaction by a condenser with controlling a pressure so that water or an organic solvent present in the reaction system is refluxed.

With controlling pressure, water or an organic solvent present in the system is refluxed, removal of heat by a condenser becomes possible, and a phenol novolak resin can be produced with good productivity. Though this reaction can be conducted without a catalyst, an acidic catalyst may also be used. As the acidic catalyst, known catalysts can be used. Specific examples thereof include: mineral acids such as hydrochloric acid, sulfuric acid and the like; organic acids such as toluenesulfonic acid, oxalic acid and the like; and salts such as zinc acetate and the like. The amount of the catalyst is usually from 0.001 to 0.1-fold mol based on the phenol.

In the reaction, an organic solvent can also be used if necessary. As the solvent, those which dissolve raw materials and the product are preferable, and aromatic solvents such as xylene, toluene and the like, for example, can be used.

As the method of conducting a reaction under pressure, there are a method in which the reaction system is purged with an inert gas at normal temperature, the system is sealed, then, the system is heated to a given temperature to make a pressurized condition; and a method in which the system is heated to a given temperature before sealed, and an inert gas is introduced to make a pressurized condition. In either case, boiling and refluxing do not occur even at a temperature of not lower than the boiling points of low boiling point components such as water, an organic solvent and the like, probably due to the presence of an inert gas. In the present invention, low boiling point components are allowed to boil by pressure reduction, namely, purging with an inert gas so as to cause reflux, and these components are reacted while removing heat by a condenser. Pressure reduction may be conducted during temperature rise or after temperature rise, and important is to control the pressure reduction so that low boiling point components are refluxed at a given temperature. Pressure reduction may be usually conducted once to give a sufficient result, but may also be conducted several times. In the case of a reaction in the absence of a low boiling point component while adding aldehyde, even if pressure is reduced at the initial period of the reaction, the production amount of water which is a low boiling point component is small, and reflux is scarcely recognized, however, reflux occurs with the progress of the reaction. In this case, pressure reduction can also be conducted after low boiling point components are stored to a certain extent.

After initiation of reflux, pressure is preferably controlled at a constant value. The pressure is usually from about 0.01 to 2.3 MPa, preferably from about 0.05 to 0.50 MPa though it differs in respective systems depending on the kind of raw materials, and the like. For controlling to a constant pressure, for example, control may advantageously be conducted using a pressure-regulating apparatus equipped with a purge valve and an inert gas introduction valve.

The reaction temperature is usually from 110 to 220° C., preferably from 110 to 160° C., further preferably from 120 to 150° C. When the temperature is too low, the reaction speed tends to lower, and when too high, aside reaction such as decomposition of a raw material, and the like tends to occur, both cases being not preferable. Further, the ortho ratio can be controlled by changing the reaction temperature. Namely, the ortho ratio increases when a reaction is conducted at a higher temperature, and decreases when a reaction is conducted at a lower temperature. In the present invention, a phenol novolak resin having an ortho ratio of 30 to 60%, suitably of 30 to 55% is produced.

The present invention can be carrier out, for example, as described below. A phenol is charged into an autoclave equipped with a thermometer and a stirrer, and if necessary a catalyst may be charged, the atmosphere is purged with nitrogen, then, the autoclave is sealed and heated. Next, pressure is reduced at a given temperature, water or an organic solvent is refluxed, and an aldehyde is added continuously or discontinuously, and the mixture is kept at the same temperature until completion of the reaction. Further, an acidic catalyst may also be charged additionally, for reduction of the reaction time. Then, the solution is neutralized with an alkali if necessary, and washed with water, dehydrated under reduced pressure, and stripping is conducted, to obtain a phenol novolak resin.

According to the above production method, the heat of reaction can be removed efficiently and a phenol novolak resin can be obtained with good productivity, therefore, the method of the present invention is advantageous for production in industrial scale. Further, according to the method of the present invention, stability of the reaction temperature is high and consequently a product having a stable quality can be obtained.

In the present invention (3), a phenol novolak resin having an ortho ratio of 30% or more is obtained by heating a crude phenol novolak resin having an ortho ratio of less than 30% at 110 to 180° C. in the presence of a strong acidic catalyst. As the crude phenol novolak resin, for example, those obtained by reacting a phenol and an aldehyde in the presence of an acidic catalyst are exemplified.

Examples of the acidic catalyst include hydrochloric acid, sulfuric acid, benzenesulfonic acid, toluenesulfonic acid, oxalic acid, phosphoric acid and the like. Particularly, sulfuric acid, benzenesulfonic acid, toluenesulfonic acid are preferable from the standpoints of reactivity and the like. The amount of the acidic catalyst is usually from 0.001 to 0.1-fold mol based on the phenol.

In the present invention, phenol novolak resins obtained by using the above phenol, aldehyde, acidic catalysts and the like are used as the crude phenol novolak resin, and there is no particular restriction providing the ortho ratio thereof is less than 30%, and of course, purified resins can also be used.

The present invention is characteristic in that the crude phenol novolak resin as described above is heated in the presence of a strong acidic catalyst, and examples of the strong acidic catalyst include hydrochloric acid, sulfuric acid, benzenesulfonic acid, toluenesulfonic acid and the like. Of them, sulfuric acid, benzenesulfonic acid, and toluenesulfonic acid are preferable. The amount of the strong acidic catalyst is usually from 0.001 to 0.1-fold by weight based on the phenol novolak resin.

The heating temperature is usually from 110 to 180° C., preferably from 120 to 150° C. When the heating temperature is too low, there is a tendency of reduction in an effect of improving the ortho ratio, and when too high, a side reaction such as decomposition of a resin, and the like tends to occur, undesirably. In the present invention, a phenol novolak resin having an ortho ratio of 30 to 60%, suitably of 30 to 55% is produced. The heating time is usually from about 2 to 24 hours though it differs the desired ortho ratio.

Thus, a phenol novolak resin having an improved ortho ratio is produced, and the desired substance can be obtained by conducting a post treatment such as neutralization, water-washing, dehydration under reduced pressure, stripping and the like.

According to the above method, a phenol novolak resin having an improved ortho ratio can be produced easily and efficiently by heating a crude phenol novolak resin using a specific catalyst of a strong acidic catalyst. Further, an industrial merit that the amount of phenol in a drain (distilled water and/or separated water) can be reduced is also obtained.

In the present invention, the ortho ratio can be attained by analyzing a binuclear body according to gas chromatography.

EXAMPLE

The following examples illustrate the present invention in detail below, but do not limit the scope of the invention. Measuring methods in the examples and the like are as described below.
(1) Ortho ratio: Ratios of three isomers of binuclear bodies (ortho-ortho ratio, ortho-para ratio, para-para ratio) were measured by gas chromatography, and the ortho ratio was calculated as follows.

Ortho ratio (%)=ortho-ortho body (%)+ortho-para body (%)/2
(2) Softening point: Measured by a Ring & ball method.
(3) Yield: Provided that the value of (weight of phenol+ weight of formaldehyde×12÷30) was defined as 100%, and calculated.

Example 1

324 g of ortho-cresol and 3.78 g of oxalic acid (dehydrate) were charged into a pressure-resistant reaction vessel equipped with a thermometer, a stirrer and a formalin injection pump and dissolved, then, the atmosphere was purged with nitrogen, the vessel was sealed and the temperature was raised. 194.6 g of 37% formalin was injected over 2 hours while keeping the temperature of the solution at 130° C., and the mixture was kept at the same temperature while stirring for 4 hours. The pressure in this reaction was 0.33 MPa at maximum. Then, the reaction solution was cooled to 85° C., and the pressure was returned to normal pressure, then, the solution was neutralized with a 10% sodium hydroxide solution. After washing with water, water and unreacted monomers were removed by distillation under reduced pressure, further, stripping was conducted until the amount of remaining ortho-cresol became 1000 ppm or less, to obtain 350 g (yield: 99.2%) of an ortho-cresol novolak resin. The ortho ratio was 40% and the softening point was 96° C. The amount of ortho-cresol in the whole drain was 0.8% based on the charged amount.

Example 2

351.2 g (yield: 99.5%) of an ortho-cresol novolak resin was obtained in the same manner as in Example 1 except that 194.6 g of 37% formalin was injected over 2 hours, then, the mixture was kept at the same temperature for 1 hour instead of 4 hours, then, 5.7 g of a 50% p-toluenesulfonic acid (monohydrate) aqueous solution was added and the mixture was further kept at the same temperature for 1 hour, in the example. The pressure in this reaction was 0.33 MPa at maximum. The ortho ratio was 40%, the softening point was 97° C., and the amount of ortho-cresol in the whole drain was 0.5% based on the charged amount.

Example 3

351.5 g (yield: 99.6%) of an ortho-cresol novolak resin was obtained in the same manner as in Example 2 except that the reaction temperature was changed to 120° C. The pressure in this reaction was 0.24 MPa at maximum. The ortho ratio was 33%, the softening point was 96° C., and the amount of ortho-cresol in the whole drain was 0.4% based on the charged amount.

Example 4

351.0 g (yield: 99.5%) of an ortho-cresol novolak resin was obtained in the same manner as in Example 2 except that the reaction temperature was changed to 140° C. The pressure in this reaction was 0.40 MPa at maximum. The ortho ratio was 45%, the softening point was 96° C., and the amount of ortho-cresol in the whole drain was 0.5% based on the charged amount.

Example 5

352.1 g (yield: 99.8%) of an ortho-cresol novolak resin was obtained in the same manner as in Example 2 except that 205.5 g of 37% formalin was used. The pressure in this reaction was 0.34 MPa at maximum. The ortho ratio was 40%, the softening point was 110° C., and the amount of ortho-cresol in the whole drain was 0.2% based on the charged amount.

Example 6

355.6 g (yield: 99.9%) of an ortho-cresol novolak resin was obtained in the same manner as in Example 2 except that 216.5 g of 37% formalin was used. The pressure in this reaction was 0.34 MPa at maximum. The ortho ratio was 40%, the softening point was 124° C., and the amount of ortho-cresol in the whole drain was 0.1% based on the charged amount.

Comparative Example 1

324 g of ortho-cresol and 3.78 g of oxalic acid (dihydrate) were charged into a round bottom flask equipped with a thermometer, a stirrer, a condenser and dropping funnel, and dissolved. The atmosphere was purged with nitrogen, then, the solution was heated up to 90° C. 75.6 g of 94% p-formaldehyde was divided into four portions and added to the solution while keeping the temperature at 90° C. over 2 hours and the resulting mixture was kept at the same temperature for 2 hours. Further, 5.71 g of a 10% p-toluenesulfonic acid (monohydrate) aqueous solution was added dropwise gradually over 2 hours while paying attention to heat generation. Then, dehydration was conducted over about 6 hours while raising temperature, and after the temperature reached 130° C., the solution was kept at the same temperature for 2 hours. Then, the solution was dissolved in methyl isobutyl ketone, and neutralized with a sodium hydroxide solution, washed with water, then, water and unreacted monomers were removed by distillation under reduced pressure, and further, striping was conducted until the amount of remaining ortho-cresol became 1000 ppm or less, to obtain 335.5 g (yield: 95.1%) of an ortho-cresol novolak resin. The ortho ratio was 39%, the softening point was 94° C., and the amount of ortho-cresol in the whole drain was 4.7% based on the charged amount.

Comparative Example 2

324 g of ortho-cresol and 5.71 g of p-toluenesulfonic acid (monohydrate) were charged into the same apparatus as in Comparative Example 1, and dissolved. The atmosphere was purged with nitrogen, then, the solution was heated, 194.6 g of 37% formalin was added dropwise over 2 hours under reflux, and the mixture was kept at the same temperature for 2 hours. Then, the solution was neutralized with a 10% sodium hydroxide solution, washed with water, then, water and unreacted monomers were removed by distillation under reduced pressure, and further, striping was conducted until the amount of remaining ortho-cresol became 1000 ppm or less, to obtain 351.7 g (yield: 99.7%) of an ortho-cresol novolak resin. The ortho ratio was 19%, the softening point was 96° C., and the amount of ortho-cresol in the whole drain was 0.3% based on the charged amount.

Referential Example 75.6 kg of ortho-cresol and 882 g of oxalic acid (dihydrate) were charged into a jacketed pressure-resistant GL vessel (300 L) equipped with a thermometer, a stirrer, a condenser and a formalin injection pump, and dissolved, then, the atmosphere was purged with nitrogen, the vessel was sealed, and the solution was heated up to 130° C. At this point, the pressure was 0.05 MPa. 37.6% formalin was initiated to be injected at a rate of 23.6 kg/hr. Directly after dropping, temperature rising was recognized due to heat generation, therefore, the vessel was cooled by the jacket, however, the temperature increased gradually and after 1 hour and 10 minutes, 27.5 kg of formalin was injected to find a temperature reached to 140° C., consequently, injection of formalin was stopped. At this moment, the pressure was 0.37 MPa. The mixture was cooled to 130° C. (pressure: 0.28 MPa) over 30 minutes, and formalin injection was started again, and 19.7 kg of formalin was charged over 50 minutes. At this point, large heat generation was not recognized, and the temperature was 130±5° C. (pressure: 0.27 to 0.31 MPa). The mixture was further kept at the same temperature while stirring for 4 hours. Then, the mixture was cooled to 85° C., the pressure was returned to normal pressure, then, the mixture was neutralized with a 10% sodium hydroxide solution. The solution was washed with water, then, water and unreacted monomers were removed by distillation under reduced pressure, and further, striping was conducted until the amount of remaining ortho-cresol became 1000 ppm or less, to obtain 82.1 kg (yield: 99.4%) of an ortho-cresol novolak resin. The ortho ratio was 42% and the softening point was 110° C.

Example 7

75.6 kg of ortho-cresol and 882 g of oxalic acid (dihydrate) were charged into the same apparatus as used in Referential Example further equipped with a constant pressure apparatus (apparatus to keep pressure constant by a purge valve and a nitrogen injection valve), and dissolved, then, the atmosphere was purged with nitrogen, the vessel was sealed, and the solution was heated up to 130° C. At this point, the pressure was 0.05 MPa. 37.6% formalin was initiated to be injected at a rate of 23.6 kg/hr. 40 minutes after, 16.7 kg of formalin was injected, and when the temperature reached 135° C. (pressure: 0.32 MPa), the purge valve was opened, the pressure was reduced and controlled at 0.19 MPa. Then, 33.0 kg of formalin was injected over 80 minutes. During this operation, reflux occurs, and the temperature was stabilized at 130±1° C. Further, the mixture was kept at the same temperature for 4 hours while stirring. Then, the same treatment was conducted as in Referential Example to obtain 82.5 kg (yield: 99.3%) of an ortho-cresol novolak resin. The ortho ratio was 41% and the softening point was 124° C.

Example 8

82.6 kg (yield: 99.4%) of an ortho-cresol novolak resin was obtained in the same manner as in Example 1 except that, after injection of formalin, the mixture was kept at the same temperature for 1 hour instead of 4 hours, then, 1.33 kg of a 50% p-toluenesulfonic acid (monohydrate) aqueous solution was added and the mixture was further kept at the same temperature for 1 hour, in Example 7. The ortho ratio was 42% and the softening point was 123° C.

Example 9

75.6 kg of ortho-cresol, 822 g of oxalic acid (dihydrate) and 10 kg of pure water were charged into the same apparatus as in Comparative Example 7, and dissolved, then, the atmosphere was purged with nitrogen, the vessel was sealed, and the solution was heated up to 130° C. At this point, the pressure was 0.32 MPa. The purge valve was opened, the pressure was reduced, the solution was refluxed and controlled at 0.19 MPa. 49.7 kg of 37.6% formalin was initiated to be injected at a rate of 23.6 kg/hr. During this operation, the temperature was stabilized at 130±1° C. Then, the same treatment was conducted as in Example 8 to obtain 82.7 kg (yield: 99.6%) of an ortho-cresol novolak resin. The ortho ratio was 43% and the softening point was 124° C.

Example 10

324 g of ortho-cresol and 5.71 g of p-toluenesulfonic acid (monohydrate) were charged into a round bottom flask equipped with a thermometer, a stirrer, a condenser and a dropping funnel, and dissolved. The atmosphere was purged with nitrogen, then, the solution was heated, and 194.6 g of 37% formalin was added under reflux condition (97 to 103° C.) over 2 hours, and the mixture was kept at the same temperature for 2 hours. Further, 11.4 g of p-toluenesulfonic acid (monohydrate) was added, the mixture was heated up to 150° C. while conducting dehydration, and the mixture was kept at the same temperature for 6 hours. Then, the mixture was neutralized with a sodium hydroxide solution, washed with water, then, water and unreacted monomers were removed by distillation under reduced pressure, and further, striping was conducted until the amount of remaining ortho-cresol became 1000 ppm or less, to obtain 346.1 g (yield: 98.1%) of an ortho-cresol novolak resin. The ortho ratio was 35%, the softening point was 95° C., and the amount of ortho-cresol in the whole drain was 1.8% based on the charged amount.

Example 11

345.2 g (yield: 97.8%) of an ortho-cresol novolak resin was obtained in the same manner as in Example 10 except that the mixture was kept at the same temperature for 12 hours instead of 6 hours in Example 10. The ortho ratio was 39%, the softening point was 95° C., and the amount of ortho-cresol in the whole drain was 2.0% based on the charged amount.

Example 12

100.0 g of an ortho-cresol novolak resin obtained in Comparative Example 4 described later and 3.8 g of p-toluenesulfonic acid (monohydrate) were charged into a round bottom flask equipped with a thermometer, a stirrer and a condenser and the mixture was kept at 150° C. for 24 hours. Then, the same post treatment as in Example 10 was conducted to obtain 98.8 g (yield: 98.8%) of an ortho-cresol novolak resin. The ortho ratio was 41%, the softening point was 96° C., and the amount of ortho-cresol in the whole drain was 1.1% based on the charged amount.

Comparative Example 3

324 g of ortho-cresol and 5.71 g of p-toluenesulfonic acid (monohydrate) were charged into the same apparatus as in Example 10, and dissolved. The atmosphere was purged with nitrogen, the solution was heated, and 194.6 g of 37% formalin was added under reflux over 2 hours, and the mixture was kept at the same temperature for 2 hours. Then, the mixture was neutralized with a 10% sodium hydroxide solution, washed with water once, then, water and unreacted monomers were removed by distillation under reduced pressure, and further, striping was conducted until the amount of remaining ortho-cresol became 1000 ppm or less, to obtain 351.7 g (yield: 99.7%) of an ortho-cresol novolak resin. The ortho ratio was 19%, the softening point was 96° C., and the amount of ortho-cresol in the whole drain was 0.4% based on the charged amount.

Comparative Example 4

324 g of ortho-cresol and 3.78 g of oxalic acid (dihydrate) were charged into the same apparatus as in Comparative Example 10, and dissolved. The atmosphere was purged with nitrogen, and the solution was heated up to 90° C. 75.6 g of 94% p-formaldehyde was divided into four portions and added to the solution while keeping the temperature at 90° C. over 2 hours and the resulting mixture was kept at the same temperature for 2 hours. Further, 5.71 g of a 10% p-toluenesulfonic acid (monohydrate) aqueous solution was added dropwise gradually over 2 hours while paying attention to heat generation. At the completion of addition, a trace amount of sample was collected and analyzed, as a result, the ortho ratio was 39%, and the amount of unreacted ortho-cresol was 10% or more. Then, the mixture was dehydrated over about 6 hours while raising temperature, and after reached 130° C., the mixture was kept at the same temperature for 2 hours. Then, the solution was dissolved in methyl isobutyl ketone, and neutralized with a sodium hydroxide solution, washed with water, then, water and unreacted monomers were removed by distillation under reduced pressure, and further, striping was conducted until the amount of remaining ortho-cresol became 1000 ppm or less, to obtain 335.5 g (yield: 95.1%) of an ortho-cresol novolak resin. The ortho ratio was 39%, the softening point was 94° C., and the amount of ortho-cresol in the whole drain was 4.7% based on the charged amount.

What is claimed is:

1. A method of producing a phenol novolak resin, comprising the steps of: reacting a phenol and an aldehyde at a temperature of 110 to 160° C. under pressure while removing the heat of reaction by condenser with controlling a pressure so that water or an organic solvent present in the reaction system is refluxed, allowing phenol novolak resin having an ortho ratio of 30% to 45% to be obtained.

2. A method of producing a phenol novolak resin, comprising the steps of: heating at 120 to 150° C. under a pressure ranging from 0.01 to 0.4 Mpa a crude phenol novolak resin having an ortho ratio of less than 30% in the presence of a strong acidic catalyst, allowing a phenol novolak resin having an ortho ratio of 30% to 45% to be obtained.

3. The method of claim 2, wherein by the heating at 120 to 150° C. of the crude phenol novolak resin having an ortho ratio of less than 30% in the presence of a strong acidic catalyst, the ortho ratio is increased to from 30% to 45% in the phenol novolak resin which is produced.

4. The method of producing a phenol novolak resin according to claim 2 wherein the strong acidic catalyst is sulfuric acid, benzenesulfonic acid or toluenesulfonic acid.

5. The method of producing a phenol novolak resin according to claim 2 wherein the phenol novolak resin is an ortho-cresol novolak resin.

* * * * *